UNITED STATES PATENT OFFICE.

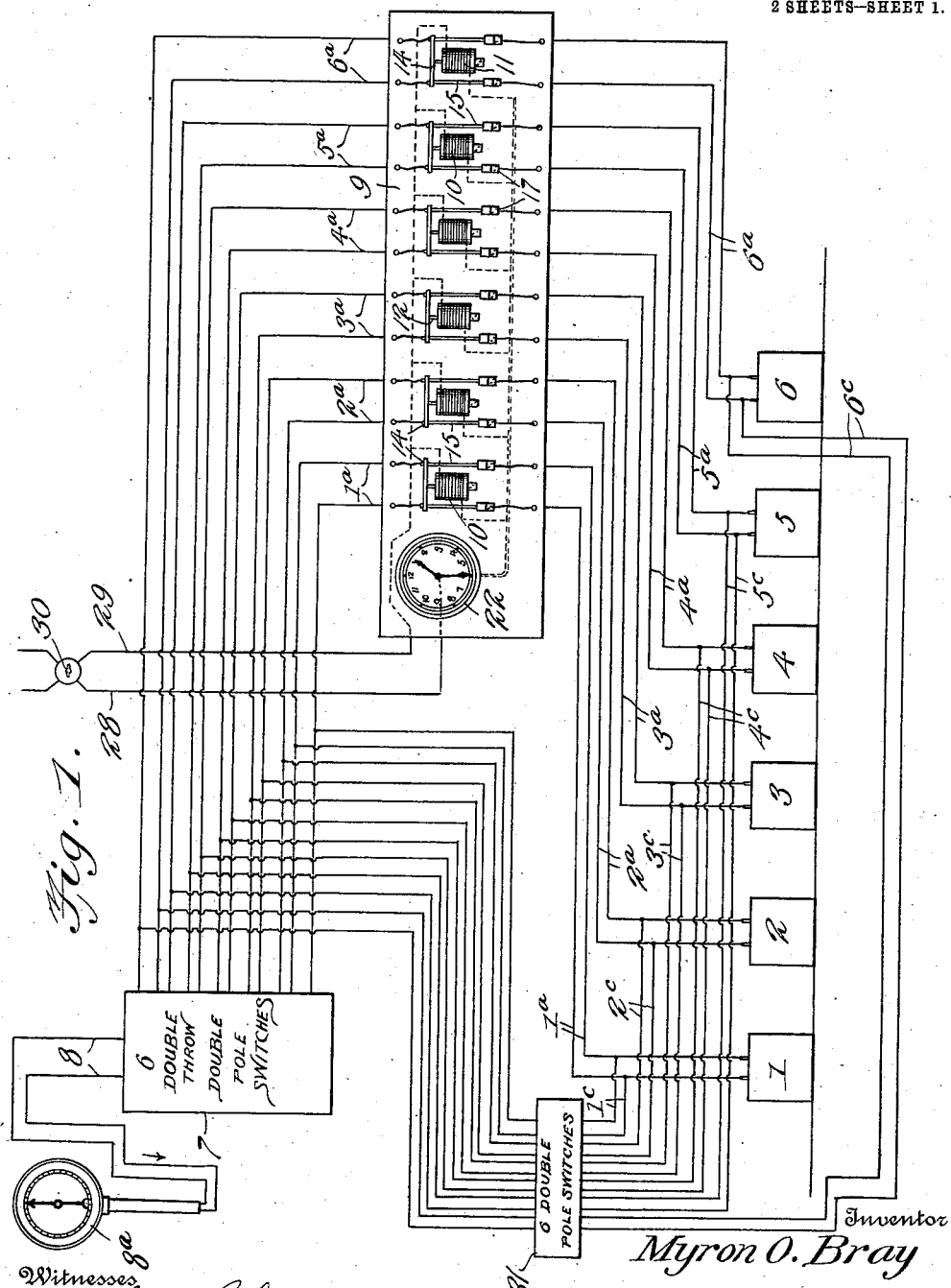

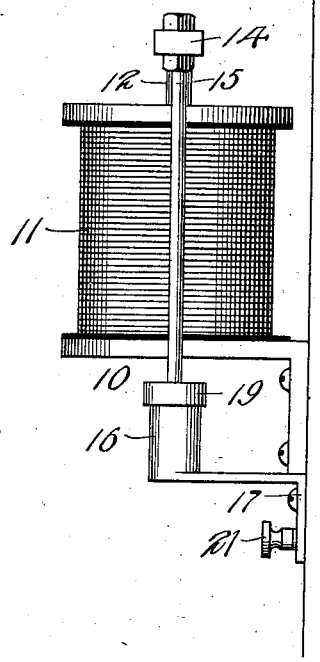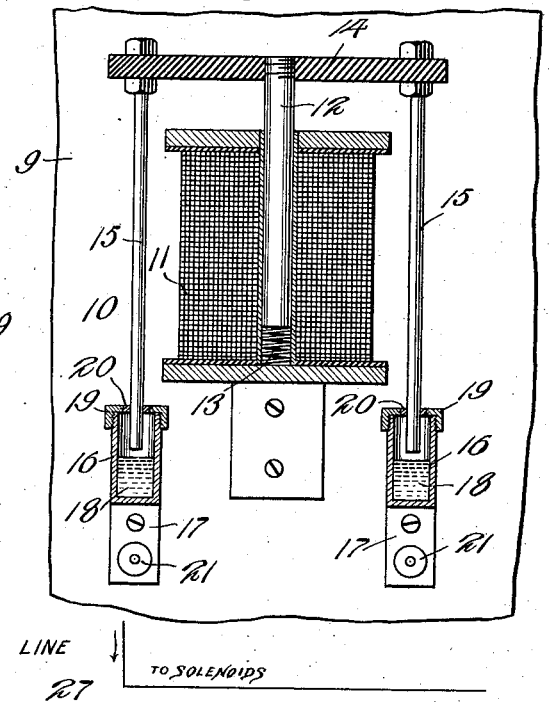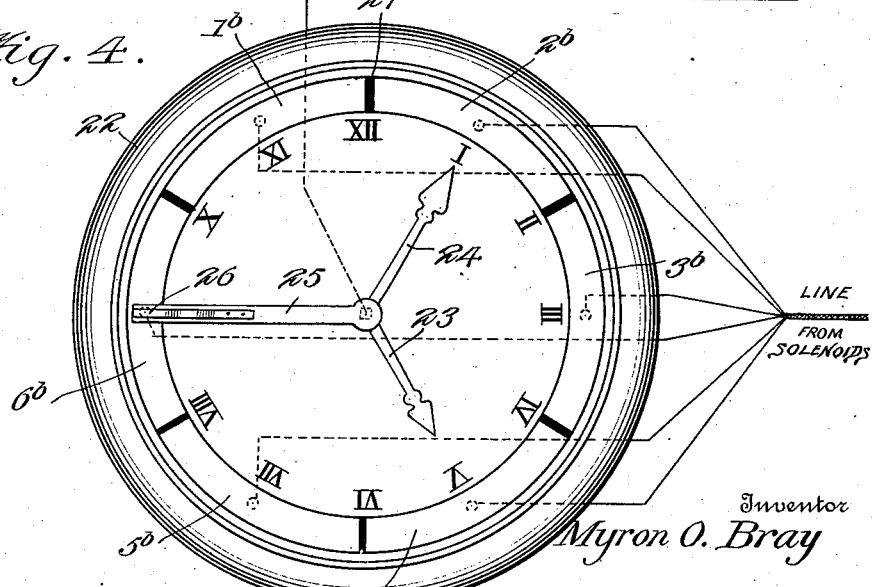

MYRON O. BRAY, OF ROCHESTER, NEW YORK.

TEMPERATURE-INDICATOR FOR TEMPERING-FURNACES.

1,010,224. Specification of Letters Patent. Patented Nov. 28, 1911.

Application filed June 4, 1910. Serial No. 565,049.

*To all whom it may concern:*

Be it known that I, MYRON O. BRAY, a citizen of the United States, residing at Rochester, in the county of Monroe and State of New York, have invented new and useful Improvements in Temperature-Indicators for Tempering-Furnaces, of which the following is a specification.

This invention relates to automatic temperature indicators for tempering furnaces, the main object of the invention being to provide thermo-electrically controlled means for indicating at and during prescribed periods the temperatures of each of a series of furnaces by and through the use of a single recording pyrometer.

A further object of the invention is to provide novel time-controlled means governing a series of thermostatically-controlled circuits operating in conjunction with a single pyrometer, whereby the ranges of temperatures of each individual furnace at specified intervals will be recorded for observation, the construction and arrangement being such as to secure greater convenience in referring to the records and obviate the necessity of employing a recorder for each furnace.

A further object of the invention is to provide means whereby the circuits may be manually controlled for testing or determining the temperature of any particular furnace at any given time.

The invention consists of the features of construction, combination and arrangement of parts, hereinafter fully described and claimed, reference being had to the accompanying drawing, in which:—

Figure 1 is a diagrammatic view of a series of furnaces and the associated temperature indicating means embodying my invention. Fig. 2 is a side view of one of the electric switches. Fig. 3 is a vertical transverse section of the same. Fig. 4 is a front view of the time-piece and associated circuit connections.

Referring to the drawings, 1, 2, 3, 4, 5 and 6 designate a series of tempering furnaces provided respectively with units of any preferred type for influencing a series of variable-resistance circuits $1^a$, $2^a$, $3^a$, $4^a$, $5^a$ and $6^a$, which circuits are adapted to be independently connected by a corresponding number of double-throw, double-pole switches 7 with conductors 8 connected with the terminals of a suitable recording pyrometer, which may be of any known type.

The said variable resistance circuits are controlled independently and successively by automatic switch mechanism embodying a switch board 9 having a series of automatic switches 10 mounted thereon, said switches being equal in number to the said variable resistance circuits and independently connected with the respective circuits. Each automatic switch device preferably comprises a solenoid 11 the movable core 12 of which is normally held elevated in circuit-breaking position by a spring 13. The upper end of this core carries a transversely arranged head or bridge piece 14 connecting the upper ends of a pair of contact rods 15 said rods being insulated from each other by the head which is composed of non-conducting material. The lower ends of the contact rods enter and are vertically movable in cups 16 supported upon the switch board by brackets 17, each of which cups contains a suitable quantity of mercury 18, with which the ends of the rods are normally out of contact. The cups are closed at their upper ends by caps 19 provided with non-conducting plugs 20 through which the rods slide, whereby the rods are insulated from the cups. Each bracket is provided with a binding screw 21 to which the adjacent ends of the branches of the associated circuit wires are connected, the proximal ends of the other branches of the circuit wires being suitably connected with the upper ends of the conducting rods 15, as shown in Fig. 1. Also supported upon the switch board is a time piece 22 having the usual hour and minute hands 23 and 24 and also provided with a contact hand 25 mounted upon the arbor for movement with the hand 24 and provided with a spring actuated contact 26. Extending around the face of the dial of this time piece is an annular series of contact plates or segments $1^b$, $2^b$, $3^b$, $4^b$, $5^b$ and $6^b$, equal in number to the furnaces and variable resistance circuits, there being one contact plate for each furnace and its associated resistance circuit, said contact plates being insulated from each other by intervening non-conducting partitions 27.

As the hand 25 sweeps around the dial a complete revolution in each hour of time, the contact 26 thereon successively rides over the surfaces of the conducting plates, having contact with each plate for a prescribed period, in the present instance ten minutes over the surface of each plate. The hand 25 is electrically connected in any suitable manner with one of the line wires 28 leading from a suitable source of current supply, which wire is also connected with one of the terminals of the winding of each solenoid of the automatic switches, the other line wire 29 being connected with the other terminals of the windings of the switches, so that the solenoids will be successively energized by the movement of the contact 26 the conducting plates of the time piece, which conducting plates are connected with the branch of the line wire 28 leading to and from the respective solenoids, as shown in Fig. 4. A switch 30 is provided in the line wires for cutting out the supply of current to the automatic switches whenever it is desired to throw the indicating mechanism as a whole out of operation. In the operation of the apparatus, it will be understood that each variable resistance circuit, except the one under the immediate control of the hand 25 of the time piece, is normally out of electrical connection with the pyrometer and, therefore, does not influence the same, the pyrometer being influenced solely by the particular circuit in electrical connection therewith through the energized automatic switch controlled by the hand 25 during the period said hand travels over the associated conducting plates of the time piece. Hence, it will be understood that in the operation of the time piece, the several circuits will be successively closed by the successive energization of the automatic switches to influence the pyrometer, which will accordingly regulate for a prescribed period each hour of the day the temperatures during such period of each furnace in regular order or succession. Upon the energization of each switch magnet, the core 12 thereof is drawn down against the action of the spring 13, thus depressing the rods 15 into contact with the mercury 18 in the cups 16 and closing the variable resistance circuit controlled thereby. Upon the energization of the magnet, the spring 13 again elevates the core and returns the rods 15 to normal position thereby opening or breaking the circuit.

In the systems now in the present use, indicating mechanism is employed for manual control, whereby a watchman or operator may throw in a switch for each furnace at a given time during the day or night to influence the pyrometer for indicating the temperature of any particular furnace for any desired time. The present invention dispenses wholly with the use of a watchman or operator for this purpose, and provides means whereby the pyrometer may be automatically influenced to successively record the temperatures of each of a number of furnaces for a given period at regular intervals of time, thus enabling a complete record to be kept without liability of errors.

Of course, it will be understood that the resistance circuits and contact plates upon the time piece may be varied in number as occasion requires to record the temperatures of a greater or less number within six furnaces, in which event the period of closing of each circuit will vary accordingly. It is desirable under some conditions to provide a means whereby the variable resistance circuits may be manually controlled for testing purposes or to enable the temperature of any circuit at the time held open by its automatic switch to be closed for the purpose of determining the temperature of the furnace controlled thereby. To this end, a series of shunt wires 1$^c$, 2$^c$, 3$^c$, 4$^c$, 5$^c$ and 6$^c$ are extended between the terminals of the wires of the respective variable resistance circuits, so as to connect the same on opposite sides of the automatic switch mechanism, said shunt wires being divided into branches adapted to be respectively connected by double pole switches 31, by means of which any of the variable resistance circuits may be closed independently of its automatic switch to effect the pyrometer to indicate the temperature of the furnace associated therewith. In this operation, in order to prevent conflict, the switch 7 controlling any of the other circuits closed by its automatic switch may be opened to temporarily break said circuit.

It will thus be seen that my invention provides a simple and effective type of automatically controlled means for indicating at and during prescribed periods the temperatures of each of a series of furnaces by and through the use of a single recording pyrometer, whereby the ranges of temperature of each independent furnace at specified intervals will be recorded for observation.

While the construction disclosed is preferred, I reserve the right to make such changes and modifications as fairly fall within the spirit and scope of the appended claims.

Having thus described the invention, I claim:—

1. In a temperature indicating apparatus for tempering furnaces, the combination with a series of furnaces, of a series of temperature controlled variable resistance circuits, one for each furnace, an indicator common to all of said circuits, switch mechanism for controlling the circuits and time controlled means governing said switch mechanism for automatically energizing said switch mechanism at prescribed intervals for successively closing the circuits for predetermined periods.

2. In a temperature indicating apparatus for tempering furnaces, the combination with a series of furnaces, of a series of temperature controlled variable resistance circuits, one for each furnace, an indicator common to all of said circuits, a series of automatic switches controlling the respective circuits, and time-controlled means for automatically successively energizing the switches at predetermined intervals to close the circuits for prescribed periods.

3. In a temperature indicating apparatus for tempering furnaces, the combination with a series of furnaces, of a series of temperature controlled variable resistance circuits, one for each furnace, an indicator common to all of said circuits, a series of automatic electro-magnetic switches controlling the respective circuits, and time controlled means for automatically and successively energizing said switches at predetermined intervals for closing said circuits for prescribed periods.

4. In a temperature indicating apparatus for tempering furnaces, the combination with a series of furnaces, of a series of temperature controlled variable resistance circuits, one for each furnace, an indicator common to all of said circuits, an automatic switch for controlling each circuit comprising coöperating contacts and a solenoid adapted upon energization to connect the same, and time-controlled means for automatically and successively energizing the solenoids of the respective switches at predetermined intervals and for predetermined periods.

5. In a temperature indicating apparatus for tempering furnaces, the combination with a series of furnaces, of a series of temperature controlled variable resistance circuits, one for each furnace, an indicator common to all of said circuits, an automatic switch arranged in and controlling each circuit, each switch comprising a solenoid having an automatically retracted core, contacts insulated from each other and carried by the core, cups containing mercury adapted to be engaged by said contacts, and a time-controlled means for automatically and successively energizing the solenoids of the respective circuits at predetermined intervals and for prescribed periods.

6. In a temperature indicating apparatus for tempering furnaces, the combination with a series of furnaces, of a series of temperature controlled variable resistance circuits, one for each furnace, an indicator common to all of said circuits, a series of automatic switches for closing the respective circuits, a main circuit, and a time piece having a contact hand connected with one of the branches of the main circuit and a series of insulated contact plates around the dial thereof connected with the respective switches, the latter also being connected with the other branch of the main circuit, whereby the switches are adapted to be automatically and successively energized for throwing in the switches at predetermined intervals and closing the circuits for prescribed periods.

7. In a temperature indicating apparatus, the combination with a series of furnaces, of a series of temperature controlled variable resistance circuits, one for each furnace, switch mechanism for controlling the circuits, temperature indicating means affected by the circuits, and time-controlled means governing said switch mechanism for automatically energizing said switch mechanism at prescribed intervals for successively closing the circuits for predetermined periods.

In testimony whereof I affix my signature in presence of two witnesses.

MYRON O. BRAY.

Witnesses:
J. SPOONER,
Mrs. SPOONER.

---

Copies of this patent may be obtained for five cents each, by addressing the "Commissioner of Patents, Washington, D. C."